(12) United States Patent
Chiang

(10) Patent No.: US 8,454,157 B2
(45) Date of Patent: Jun. 4, 2013

(54) THREE-DIMENSIONAL GLASSES

(75) Inventor: Wen-Lin Chiang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 187 days.

(21) Appl. No.: 13/013,818

(22) Filed: Jan. 26, 2011

(65) Prior Publication Data

US 2012/0140321 A1    Jun. 7, 2012

(30) Foreign Application Priority Data

Dec. 2, 2010  (TW) .................................. 99141988

(51) Int. Cl.
*G02C 1/00* (2006.01)
*G02C 11/00* (2006.01)

(52) U.S. Cl.
CPC ..................... *G02C 11/10* (2013.01)
USPC ......................................... 351/158

(58) Field of Classification Search
CPC ....................................................... G02C 11/10
USPC ................................ 351/41, 158; 349/13–15
See application file for complete search history.

(56) References Cited

U.S. PATENT DOCUMENTS

2008/0062338 A1*   3/2008   Herzog et al. ................... 349/13

* cited by examiner

*Primary Examiner* — Huy K Mai
(74) *Attorney, Agent, or Firm* — Altis Law Group, Inc.

(57) ABSTRACT

A pair of three-dimensional glasses include two lenses, a frame holding the two lenses, a circuit board controlling the two lenses, and a power unit powering the circuit board. The power unit includes a control switch. The control switch extends from an inner surface of the frame. The circuit board is powered on when the control switch is contacted, and powered off when the control switch is not contacted.

15 Claims, 3 Drawing Sheets

THREE-DIMENSIONAL GLASSES

BACKGROUND

1. Technical Field

The present disclosure generally relates to imaging technology, and particularly to three-dimensional (3D) imaging glasses.

2. Description of Related Art

The illusion of three dimensions on a two dimensional surface can be created by providing each eye with different visual information. 3D glasses create the illusion of three dimensions when viewing specially prepared images. Passive 3D glasses can have one red color filter lens in front of one eye and one blue or cyan color filter lens in front of the other, or use polarized filters, with one lens polarized vertically and the other horizontally, with the two images required for stereo vision polarized the same way. Polarized 3D glasses allow for a more colorful 3D image, compared to the red-blue lenses which produce only a dull black-and-white picture with red and blue fringes.

Active 3D glasses can achieve the 3D image through active function, including dual display 3D glasses and liquid crystal shutter glasses. The dual display 3D glasses have separate video screens for each eye. The liquid crystal shutter glasses cooperate with a 3D display screen, and include two liquid crystal units to shutter right-eye image and left-eye image by turns. The liquid crystal shutter glasses have been distributed to audiences at 3D movies.

The active 3D glasses require electric power to perform the shuttering operation, but should also be portable, making power supply a challenge. Continued power supply consumes too much electric power, and electric wires are inconvenient for the portable 3D glasses. Related active 3D glasses may have a switch to turn on or turn off the active 3D glasses. However, users can often forget to turn off the active 3D glasses during standby and idle periods. Some active 3D glasses cooperate with additional devices detecting the usage state of the glasses and control the power supply accordingly. If the active 3D glasses are left unused for a period, the sensor sends signals to stop the power supply. However, such devices are usually expensive.

Therefore, it is desirable to provide 3D glasses which can overcome the described limitations.

BRIEF DESCRIPTION OF THE DRAWINGS

Many aspects of the 3D glasses can be better understood with reference to the following drawings. The components in the drawings are not necessarily drawn to scale, emphasis instead being placed upon clearly illustrating the principles of the present disclosure. Moreover, in the drawings, like reference numerals designate corresponding parts throughout the several views.

DETAILED DESCRIPTION

Figure 1:
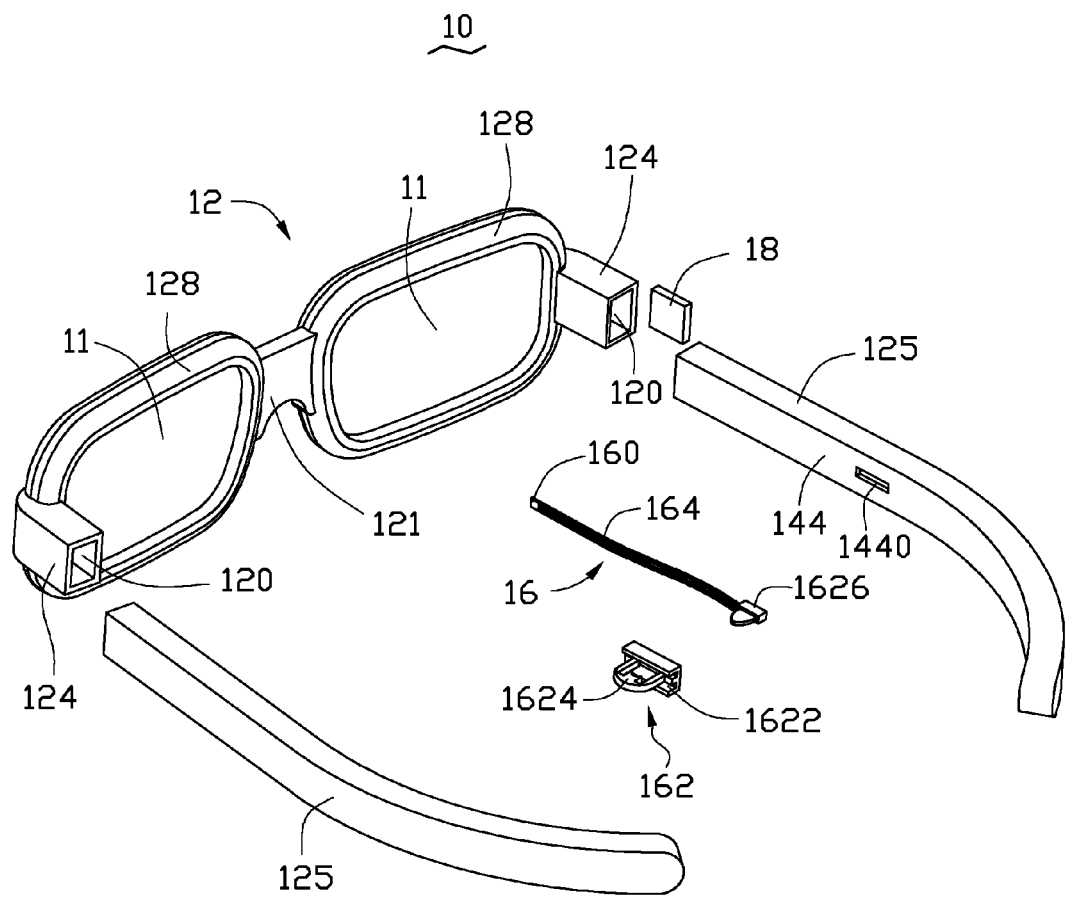
FIG. 1 is an exploded, isometric view of 3D glasses according to one embodiment.
Figure 2:
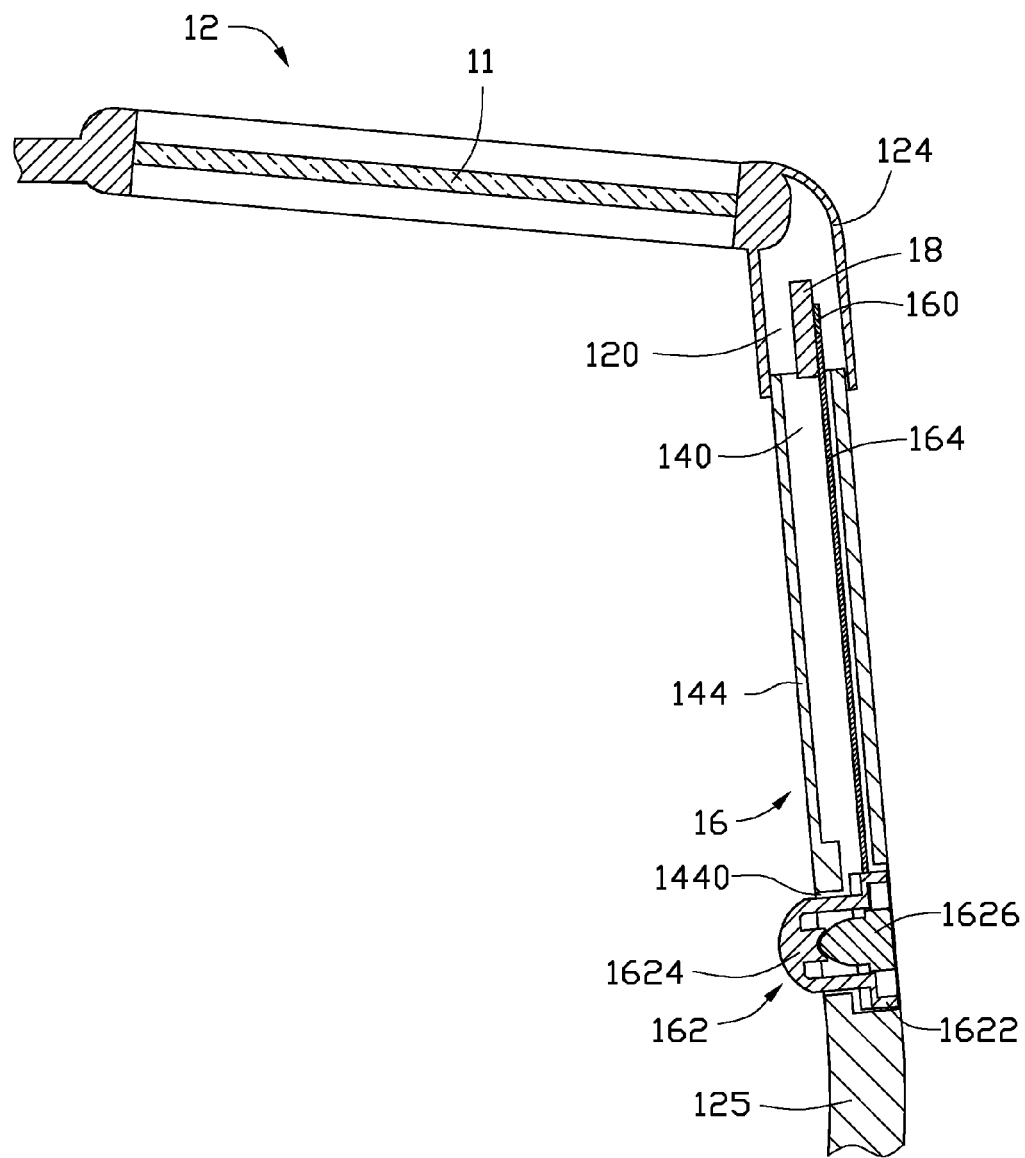
FIG. 2 is a partial, isometric view of the 3D glasses of FIG. 1 when idle.

As shown in FIG. 1 and FIG. 2, 3D glasses 10 of one embodiment include two lenses 11, a frame 12, a power unit 16 and a circuit board 18.

The lenses 11 may be photoelectric units, such as display screens or liquid crystal shutters, but are not limited thereto.

The frame 12 includes two rims 128 respectively holding the two lenses 11, a bridge 121 connecting the two rims 128, two connection bases 124 respectively connected to the two rims 128, and two temples 125 respectively connected to the two connection bases 124. Each connection base 124 and each temple 125 respectively defines a first hollow 120 and a second hollow 140 therein, and the first hollow 120 and the second hollow 140 cooperatively form a cavity. The two temples 125 may be respectively connected to the two connection bases 124 through rotation shafts or hinges, so the temples 125 are rotatable against the connection bases 124. Accordingly, the temples 125 can bend toward the lenses 11 to be stored or can be unfolded for use. The two temples 125 may be respectively fixed to the two connection bases 124 through other means, or may just be received in the two connection bases 124 in other embodiments. The connection bases 124 may be fixedly connected or rotatable to the rims 128 through any means.

The circuit board 18 is stored in the first hollow 120 of one connection base 124, and can be screwed to the connection base 124. The circuit board 18 includes electric elements and circuits to actively control the two lenses 11, so different images or shutters are provided for each side and 3D stereoscopic images are generated. The power unit 16 includes a battery 160, a control switch 162 and a lead wire 164. The battery 160 is also stored in the first hollow 120 of the connection base 124, and is located on the circuit board 18. The battery 160 is electrically connected to the control switch 162 and the circuit board 18 to supply electric power to the circuit board 18.

The control switch 162 is located on one of the temples 125. The temple 125 has an inner surface 144 and defines an opening 1440 in the inner surface 144. The opening 1440 communicates the second hollow 140 and the surroundings. The control switch 162 is aligned with the opening 1440. A portion of the control switch 162 is stored in the second hollow 140, and a portion of the control switch 162 extends through the opening 1440 of the temple 125. The control switch 162 includes a base 1622 stored in the second hollow 140 of the temple 125, an electrical contact 1626 surrounded by the base 1622 and extending through the base 1622, and an elastic protrusion 1624 extending from both the base 1622 and the opening 1440 of the temple 125.

The base 1622 may be screwed to or adhered to a sidewall of the temple 125, and faces the opening 1440. The base 1622 surrounds the electrical contact 1626, and can retain the positions of the electrical contact 1626 and the elastic protrusion 1624, so the elastic protrusion 1624 can always face the electrical contact 1626. The elastic protrusion 1624 includes a convex outer surface and a concave inner surface. The elastic protrusion 1624 is contoured to be activated by touch or press, so it is located right above the electrical contact 1626. Accordingly, the outer surface of the elastic protrusion 1624 is also the outer surface of the control switch 162, and the elastic protrusion 1624 extends from the inner surface 144 of the temple 125.

The lead wire 164 is electrically connected to the electrical contact 1626 and the battery 160. The lead wire 164 may include two wires to electrically connect the battery 160 and the control switch 162. One of the wires may electrically connect the electrical contact 1626 and an anode or a cathode of the battery 160, and the other wire may electrically connect the other electrode of the battery 160 and a portion of the control switch 162 that will contact the electrical contact 1626 when the elastic protrusion 1624 is contacted.

When the control switch 162 is not contacted, the elastic protrusion 1624 does not bias the electrical contact 1626, so the circuit between the battery 160 and the circuit board 18 remains open. Since the control switch 162 is located on the inner surface 144 of the temple 125, when not worn, the 3D glasses 10 automatically turn off, and no electric power of the battery 160 is expended. With no additional step required to turn off the 3D glasses 10, no additional mechanism is needed to detect the operation of the 3D glasses 10, and costs are conserved.

Figure 3:
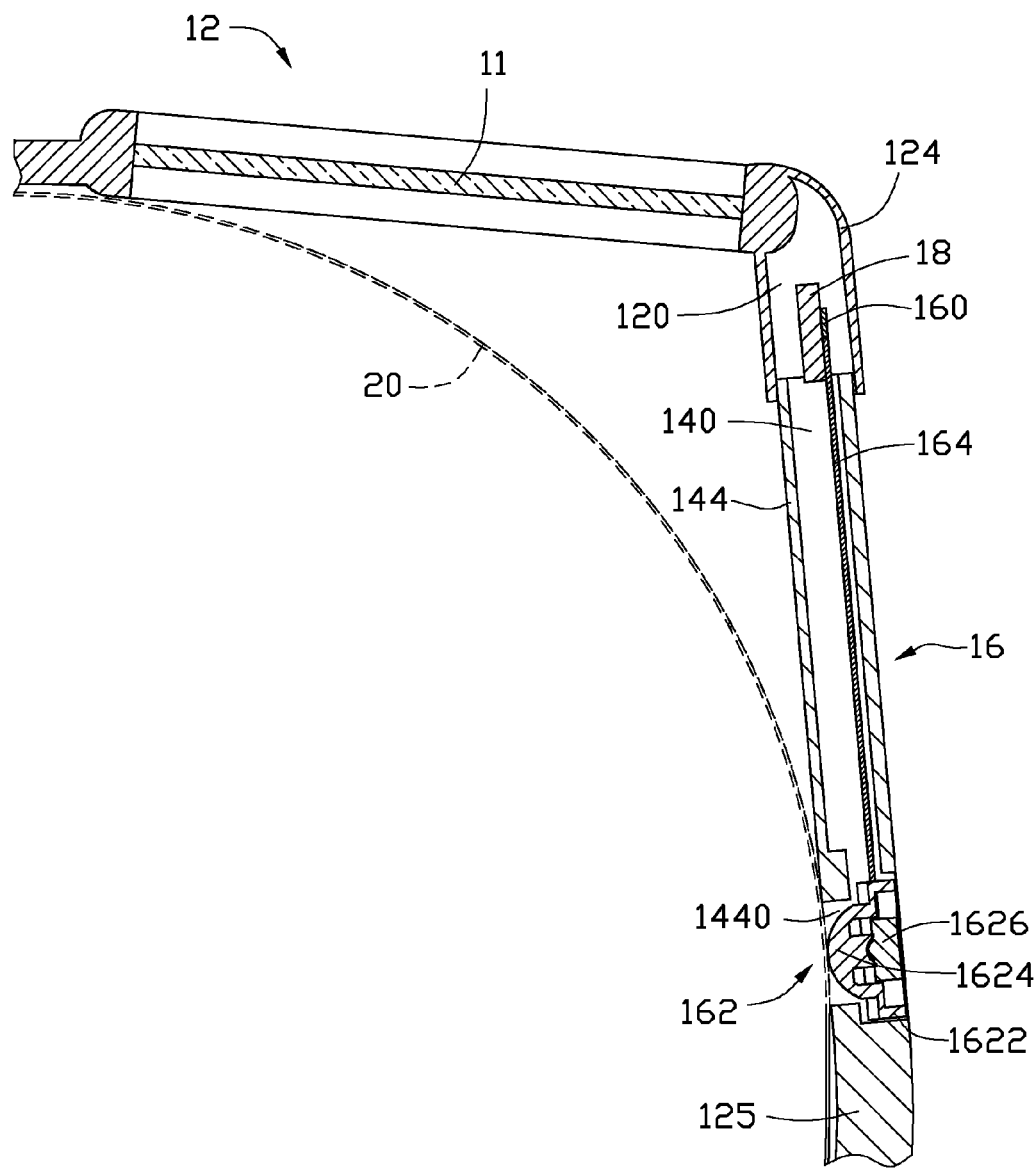
FIG. 3 is a partial, isometric view of the 3D glasses of FIG. 1 in use.

As shown in FIG. 3, when the 3D glasses 10 are worn, the 3D glasses 10 are mounted on the head 20 (marked by the dotted line in FIG. 3), and the temples 125 contact the head 20. The control switch 162 located on the inner surface 144 is automatically contacted, and the elastic protrusions 1624 biased. Accordingly, the elastic protrusion 1624 activates the electrical contact 1626 to complete the circuit between the battery 160 and the circuit board 18 and power is supplied to the circuit board 18 and the lenses 11 operate. Thus, once the 3D glasses 10 are worn, the 3D glasses 10 are automatically turned on, and no additional step is needed to turn on the 3D glasses 10.

When the 3D glasses 10 are removed, force of the elastic protrusion 1624 automatically recovers shape and position thereof, whereby the control switch 162 again extends from the inner surface 144 of the frame 12, and the 3D glasses 10 are automatically turned off.

Compared to the relative art, supply and stop of the electric power are automatically switched according to the wear of the 3D glasses of the present disclosure. Once the 3D glasses are worn, the 3D glasses are turned on; and once the 3D glasses are taken off, the 3D glasses are turned off. Thus, the electric power is effectively saved, and the usage of the 3D glasses is convenient. Furthermore, the 3D glasses of the present disclosure can have a simpler structure then the relative 3D glasses including other power-saving unit.

It is believed that the present embodiment and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. A pair of three-dimensional glasses, comprising:
    two lenses;
    a frame holding the two lenses;
    a circuit board configured to control the two lenses; and
    a power unit configured to power the circuit board, the power unit comprising:
        a control switch provided on the frame, the control switch comprising an electrical contact, and an elastic protrusion extending from an inner surface of the frame;
        a battery configured to supply electric power to the circuit board;
        a first wire electrically connected to the electrical contact and a first electrode of the battery; and
        a second wire electrically connected to a second electrode of the battery and a portion of the control switch that contacts the electrical contact when the elastic protrusion is pressed;
    wherein the circuit board is powered on when the elastic protrusion of the control switch is pressed, and the circuit board is powered off when the elastic protrusion of the control switch is not being pressed.

2. The pair of three-dimensional glasses of claim 1, wherein the frame comprises:
    two rims respectively holding the two lenses; and
    a first temple and a second temple respectively connected to the two rims; and the control switch is located on the first temple.

3. The pair of three-dimensional glasses of claim 2, wherein the frame further comprises a bridge connecting the two rims.

4. The pair of three-dimensional glasses of claim 2, wherein the first temple defines a first hollow therein.

5. The pair of three-dimensional glasses of claim 4, wherein the frame further comprises a first connection base and a second connection base, the first connection base connects the first temple and one of the two rims, and the second connection base connects the second temple and the other of the two rims.

6. The pair of three-dimensional glasses of claim 5, wherein the first connection base defines a second hollow therein, and the first and the second hollows cooperatively form a cavity.

7. The pair of three-dimensional glasses of claim 6, wherein the circuit board is received in the cavity to control the two lenses.

8. The pair of three-dimensional glasses of claim 6, wherein the first temple defines an opening in an inner surface thereof, a portion of the control switch is received in the cavity, and another portion of the control switch extends through the opening of the first temple.

9. The pair of three-dimensional glasses of claim 6, wherein the control switch further comprises a base stored in the cavity, and the elastic protrusion is aligned with the electrical contact.

10. The pair of three-dimensional glasses of claim 9, wherein the elastic protrusion is contoured to be pressed by a user when the user wears the pair of three-dimensional glasses.

11. The pair of three-dimensional glasses of claim 10, wherein when the elastic protrusion is pressed and the circuit board is powered on, the electrical contact completes a circuit between the battery and the circuit board, with the circuit comprising the control switch, the first wire and the second wire.

12. The pair of three-dimensional glasses of claim 11, wherein an elastic force of the elastic protrusion recovers a shape and a position of the elastic protrusion when the elastic protrusion is not pressed.

13. The pair of three-dimensional glasses of claim 4, wherein the battery is located on the circuit board, and the control switch is located in the first hollow of the first temple.

14. The pair of three-dimensional glasses of claim 1, wherein the battery is electrically connected to the circuit board.

15. The pair of three-dimensional glasses of claim 1, wherein the elastic protrusion of the control switch is contoured to be pressed by a head of a user when the user wears the pair of three-dimensional glasses.

* * * * *